UNITED STATES PATENT OFFICE.

LYDIA J. CADWELL, OF CHICAGO, ILLINOIS.

METHOD OF DRYING DISTILLERS' SLOPS.

SPECIFICATION forming part of Letters Patent No. 353,017, dated November 23, 1886.

Application filed October 28, 1885. Serial No. 181,175. (No specimens.)

*To all whom it may concern:*

Be it known that I, LYDIA J. CADWELL, of Chicago, in the county of Cook and State of Illinois, have invented certain new and useful Improvements in Methods of Preparing Dry Cattle Feed from Distillers' Slops and Brewers' Grains; and I do hereby declare that the following is a full, clear, and exact description thereof.

The economical preparation of dry feed from the substance known as "distillers' slops" has heretofore remained an unsolved problem. The obvious method of pressing out the great bulk of the water, and thereafter drying the solid matters has been commonly resorted to as being the most expeditious, though admitted to be extremely wasteful by reason of the loss of gluten and other nutritive elements, which are expressed with the water. Drying by evaporation has also been tried; but this method, while more saving of nutritive qualities in the feed product, is extremely slow, troublesome, and expensive, and requires a large area of pans, and much handling, and fuel. No method heretofore tried having proven in all respects satisfactory, it is customary for distillers to dispose of their slops in their saturated state either by feeding them to cattle kept on or near the premises, or by selling them at a low price for use in the vicinity.

The object of this invention is to provide a practicable and expeditious method of drying distillers' slops, and to produce an improved food compound for cattle, containing such slops in condition suitable for keeping and transportation.

To these ends the invention consists in the method of drying distillers' slops by first draining the slops of the free water which may be thus removed, then mixing the residuum with brewers' grains, previously malted and dried, whereby a friable mass is produced, then disintegrating the mass, and at the same time subjecting it to a current of drying air until dried.

In carrying my invention into practice I propose to allow the slops to stand until the solids and gluten have settled, and to thereafter drain off the body of water which stands above the glutinous and starchy liquid which permeates and rests upon the broken grain. The residuum thus obtained is too wet to be friable, and by the usual previous methods of drying it requires to be treated as above stated. The brewers' grains, on the other hand, leave the mash-tub in a mass, which, though wet, is frangible, and is capable of being disintegrated, and thereby opened out to drying currents of air, and for the purpose of drying the same economically and rapidly I propose to expose these grains in a drier of rotary or other construction calculated to open up the mass and to admit the air thereto—as, for example, in such a drier as is described by me in a prior application for patent, Serial No. 176,650. When the brewers' grains are dried they are in condition for preservation as feed; but being broken they are also admirably suited to readily absorb moisture. Upon mixing the dried brewers' grains with the drained distillers' slops, therefore, the free moisture in the latter is readily taken up in part by the former. The proportions of dried grains and slops may be readily adjusted to give to the mass substantially the same condition as the brewers' grains possessed when taken from the mash-tub, or any other or less degree of wetness that may be preferred. Such mixed mass is thus adapted to be broken up in a drier of the character mentioned, and is rendered capable of being dried out rapidly by a method which also preserves the nutritive elements.

The mixing of the dry brewers' grains with the wet slops may be effected by any suitable mechanism for stirring substances together, and the drying may be performed in any sort of drier adapted to stir up and open out or disintegrate the mass being dried, and to expose the same to an active air-current while thus being broken up.

It will be seen from the foregoing description that the method of drying as applied to the slops involves, first, absorption by another substance of part of the water contained in the drained but still fluid mass of slops, whereby the meal and gluten thereof form or may be separated into a mass of fragments; and, secondly, the subjection of this granular or broken body to suitable drying agencies.

The invention herein described is not limited to the use of brewers' grains alone.

The compound (of brewers' grains and distillers' slops) produced by the above-described process is found to be most desirable cattle-feed, greatly superior to either alone, and one in which the commercial value of the ingredients are materially enhanced by their combination and mode of preparation.

I am aware that it has been proposed to pour the liquid slop directly after distillation upon cracked or ground corn-cobs or other fodder just fast enough to allow the slop to filter through the mass, and to then in some way dry the ground fodder together with the residua retained therein from the slops. This mode of treatment is not my invention, nor does it attain the objects of my above-described method. The filtration of said proposed method necessarily allows a large and valuable part of the slop—to wit, the starchy and glutinous liquid—to escape with the water, so that the portion arrested by the ground fodder acting as a filter and the final mixed product has far less value as a food. In another instance it has been proposed to place the slop in sacks or other straining apparatus from which the liquid may run off, and to mix the residuum in indefinite proportions with husks, seeds, or other vegetable substance, such mixture being afterward in some way dried. This method corresponds, essentially, with that above referred to, and has the same disadvantage of wasting the nutritive, glutinous, and starchy substances, which obviously flow off with the water. By my method, on the other hand, the glutinous and starchy matters are first precipitated upon the solid grain substance, and the water alone is drawn off, after which the solid and the precipitated glutinous and starchy substances, which are all preserved, are mixed with the dry brewers' grains and afterward dried. Moreover, my method contemplates specifically a mixture of the residuum and grains in such definite proportions as will produce a frangible mass capable of being broken up by a machine of the character referred to, and the drying of the same by the specific method of passing through it a current of heated air by which alone the drying can be practically and profitably effected.

I claim as my invention—

The method of preparing a food product from distillers' slops and brewers' grains, or other substances similar to brewers' grains, which consists in first settling the slops, whereby the solid, the glutinous, and the starchy substances are precipitated, then drawing off the water, then mixing the wet, starchy, glutinous, and solid residua with dry brewers' grains or other dry vegetable substance, whereby a frangible mass is produced, and finally disintegrating the mass in the presence of a current of heated air, substantially as described.

In testimony that I claim the foregoing as my invention I affix my signature in presence of two witnesses.

LYDIA J. CADWELL.

Witnesses:
R. G. DYRENFORTH,
SCHUYLER DURYEE.